G. F. JONTZ.
FAN PULLEY ASSEMBLY.
APPLICATION FILED JAN. 3, 1921.
1,408,602.
Patented Mar. 7, 1922.
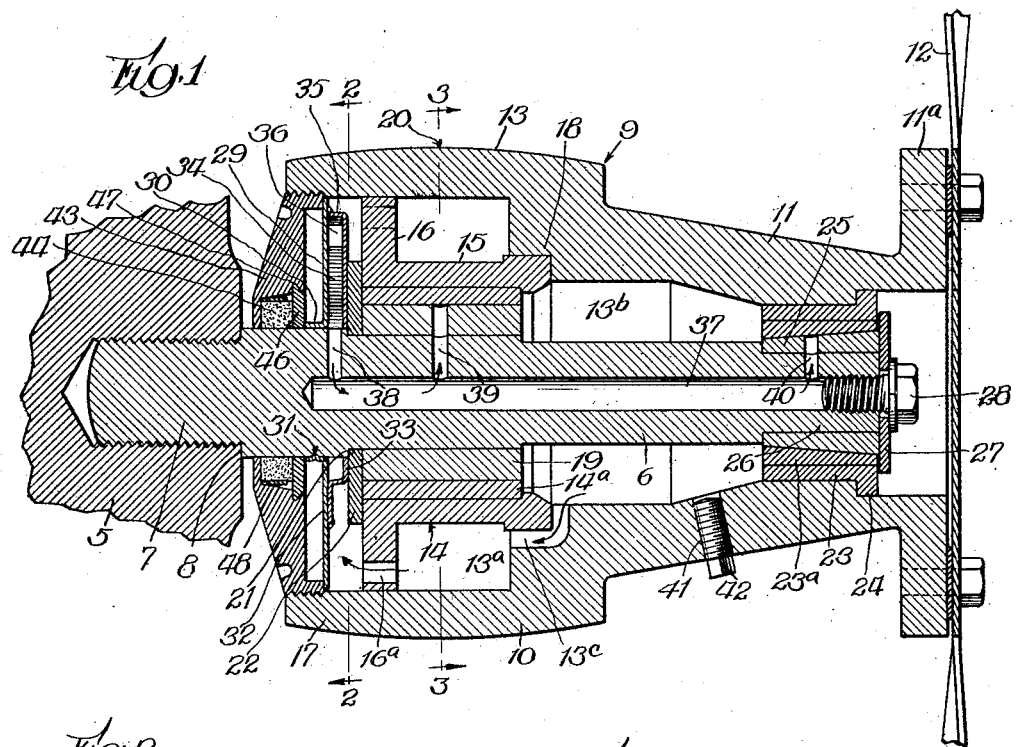
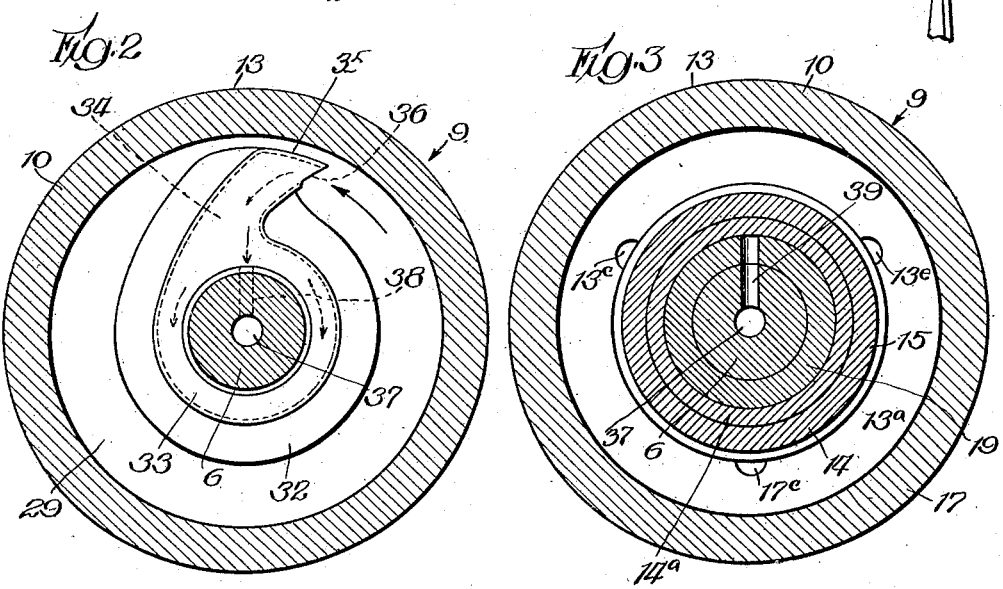
Inventor
Guy F. Jontz
By Charles O. Shervey
his Atty

UNITED STATES PATENT OFFICE.

GUY F. JONTZ, OF ROCK ISLAND, ILLINOIS.

FAN-PULLEY ASSEMBLY.

1,408,602.　　　　Specification of Letters Patent.　　Patented Mar. 7, 1922.

Application filed January 3, 1921. Serial No. 434,645.

*To all whom it may concern:*

Be it known that I, GUY F. JONTZ, a citizen of the United States, and a resident of Rock Island, Rock Island County, and State of Illinois, have invented certain new and useful Improvements in Fan-Pulley Assemblies, of which the following is declared to be a full, clear, and exact description.

This invention relates to fan pulley assembly and its principal object is to provide a fan pulley assembly having characteristic bearing features, whereby the fan may be driven at an extremely high rate of speed under a heavy load, without rapidly wearing down the bearing surfaces. It relates more particularly to a fan pulley construction wherein the shaft of the pulley is supported at one end only, and in such cases great difficulty has been encountered in providing bearings that will stand up under the strain and the high rate of speed required of fans of this type. This fan construction has been designed for use on motors for automobiles, tractors and the like, where fans of this type are employed, and other of the objects are to provide such fan pulley construction of simple, substantial and practical construction, containing novel lubricating features. The invention consists in the several novel features hereinafter fully set forth and claimed.

The invention is clearly illustrated in the drawings accompanying the specification, in which:—

Fig. 1 is a central longitudinal section through a fan pulley assembly, embodying a simple form of the present invention; Fig. 2 is a vertical cross section taken on line 2—2 of Fig. 1 and Fig. 3 is a vertical cross section taken on line 3—3 of Fig. 1.

Referring to said drawing, the reference character 5 designates a support of any suitable character, as for instance a motor, frame or other body and 6 designates a stationary shaft having a threaded end 7 threadedly secured in said support 5. The shaft 6 is preferably shouldered as at 8 to bear against the face of its support.

Rotatively mounted on said shaft 6 is the pulley body 9 which is formed with a pulley portion 10, which is preferably of the convex face type, and a tapered, axially projecting hub portion 11 on the end of which is formed an annular flange 11ª to which is bolted a fan 12 of any suitable construction. The pulley body is hollow and open ended, and under its pulley face 13 the cavity or chamber 13ª is made large enough to receive the main bearings for the pulley, which bearings are made of large diameter so as to obtain a rugged and substantial bearing.

In the hollow space 13ª of the pulley portion is secured a bearing bushing 14 having an annular body portion 15 formed with an annular flange 16 at one end. The body portion 15 is of a somewhat less external diameter than the internal diameter of the pulley wall 17 and seats in a rabbeted part 18 formed in the internal face of the hub cavity 13ᵇ. The flange 16 seats against the internal face of the pulley wall 17 and the entire bushing 14 is held in place by frictional engagement with the internal wall of the pulley body. Fixedly secured to the shaft 6 within said bushing 14 is a bearing bushing 19 of steel or other suitable metal, which bushing is disposed directly under the pulley face 13 and extends equidistantly in both directions from a plane taken through the peak 20 of the pulley face. In other words the bearing surface between the pulley and shaft is distributed equally at both sides of a plane passing through the peak 20 of the pulley whereby the load may be equally distributed at both sides of said line. The bushing 19 may bear against the internal face of the bushing 14 although I have shown a facing 14ª of suitable bearing metal interposed therebetween, which may be poured in, in the same manner as Babbitt metal is poured in to provide bearing surfaces.

Between the bushing 19 and an annular shoulder 21 on the shaft 6 is a washer 22 which provides an annular flange that projects beyond the bushing 19 and takes up any end thrust from the pulley in its direction.

At the free end of the shaft 6 is a stabilizing bearing which will now be described.

Secured in the hollow 13ᵇ of the tapered hub part 11 of the pulley body, is a bearing bushing 23 which has an annular flange 24 that engages a shoulder on the internal wall of said hub portion. A stationary bearing bushing 25 is fixedly secured upon a reduced end portion 26 of the shaft and bears upon said bushing 23 or an interposed facing or body of bearing metal 23ª. The several bushings are preferable fixedly secured in place by a driving or press fit. For very high speed and heavy loads, it is preferred that the bearing faces of the bushings 23, 25, be tapered, the faces tapering toward the place of support of the shaft, whereby any side thrust caused by centrifugal force at the outer end of the pulley body may be met squarely along a line at right angles to said side thrust. A washer 27 at the outer end of the shaft 6 takes up end thrust in its direction, and said washer may be held in place on the shaft by a bolt or cap screw 28, threaded in the end of the shaft 6.

As a preference, oil is used as a lubricant for the bearings of the device, and the unoccupied spaces in the hollow or cavity of the pulley body are used to contain a body of oil. Improved means are provided for circulating the oil between the bearing surfaces and said means will now be described.

Secured on the shaft 6, directly beyond the washer 22 is a thin, centrally apertured disc like diaphragm or wall 29 which extends to the internal wall of the cavity; said diaphragm may be conveniently secured on the shaft by forming it with a flange 30 that surrounds the shaft and by upsetting the metal of said flange at intervals into sockets 31 in the face of the shaft. Secured to said diaphragm, as by spot welding it thereto, is a disc of thin sheet metal struck up to provide a flange portion 32 which fits against the face of the diaphragm, an annular offset portion 33 that surrounds the shaft, and forms an annular channel around it, and a tangential inlet passage 34 closed at its end by a wall 35 and having an inlet port 36 through which oil may enter said passage 34 and move to the annular channel part. The shaft is drilled to provide a central oil duct or passage 37 to which opens a transverse, short passage 38 that leads from the annular channel, and two transverse passages 39, 40, lead from said central oil duct through the bushings 19, 25, and open out to the bearing surfaces between the bushings 19, 14, 25, 23. Ports 14$^a$ lead from the cavity 13$^b$ to the cavity around the bushing 19 and ports 16$^a$ lead from said cavity around the bushing to the space between the flange 16 of said bushing and the diaphragm 29. A filler hole 41 is provided in the wall of the tapered part or hub of the pulley body, which hole is closed by a screw threaded plug 42.

The cavity or hollow of the pulley portion is closed by an end cover plate 43 which is threadedly secured in the pulley. Leakage of oil around the shaft is prevented by a felt washer 44 held in a cavity or recess in the end cover plate 43 by a metal washer 46, which is sprung into a groove 47 in the internal face of the recessed part. A flat, split, spring ring 48 around the felt washer tends to compress it and hold it in firm contact with the shaft.

It is to be observed that by reason of the location and disposition of the main plain bearings, the load is distributed equally across the bearing faces of the bushings directly under the fan belt. The wear upon the bearing faces is thereby minimized, and the bearings therefore withstand the strain caused by the high velocity of the device. Moreover, by the use of rugged bearings at this place and having a bearing surface of maximum diameter, the wear is less, and the device may revolve at maximum high speed without rapidly destroying or wearing down the bearing surfaces.

Oil contained in the space between the bushing and diaphragm is fed through the inlet port of the oil collector and passes to the annular channel 33 thence through the passageways 38, 37, 39, 40 to the bearing surfaces. Oil from the part 13$^b$ of the cavity passes through the ports 14$^a$ to the part 13$^a$ of the cavity, and thence through the ports 16$^a$ to the space between the flange 16 and diaphragm 29 from which it is introduced into the inlet of the oil collector. The diaphragm also acts to prevent the oil from being splashed against the joint between the cover plate and shaft.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new and desire to secure by Letters Patent:

1. In a fan pulley assembly, a hollow fan pulley body, having a pulley face, and an extended hub portion, a shaft, stationarily supported at one end only, said pulley body having a bearing face disposed in its hollow portion and centrally and wholly under its pulley face, and said shaft having a bearing face for receiving the bearing face of said pulley body and being located centrally under said pulley face, there being separate bearing surfaces between the far end of the hub portion and shaft.

2. In a fan pulley assembly, a hollow fan pulley body having a pulley face and an extended hub portion, a shaft stationarily supported at one end only, a bearing bushing fixedly secured in the hollow of said pulley body wholly and centrally under its pulley face, and a bearing bushing fixedly secured to said shaft and having a bearing surface for the bearing surface of the pulley bushing, disposed centrally under the pulley face thereof, there being separate bearing bushings located at the far end of said hub portion and shaft.

3. In a fan pulley assembly, a hollw fan pulley body having a convex pulley face and an extended hub portion, a shaft, stationarily supported at one end only, a bearing bushing fixedly secured in the hollow of said pulley body wholly under said pulley face and having an internal cylindrical bearing face symmetrically disposed to each side of a plane passing through the peak of said convex pulley face and a bearing bushing fixedly secured to said shaft and having an external cylindrical bearing face for receiving the bearing face of the bushing of the pulley body, the contiguous bearing faces of said bushings being distributed over equal areas at equidistant places from said plane passing through the peak of said convex pulley face, there being separate bearing bushings located at the far end of said hub portion and shaft.

4. In a fan pulley assembly, a hollow fan pulley body having a pulley face and a hub portion, a shaft stationarily supported at one end only, plain face bearing bushings fixedly secured on the pulley body and shaft wholly and centrally under said pulley face, and separate plain face bearing bushings fixedly secured in the far end of the hub portion of said pulley body and on said shaft for stabilizing the outer end of said pulley body.

5. In a fan pulley assembly, a hollow pulley body adapted to contain oil and having a pulley portion and a hub extension, a shaft stationarily supported at one end only, plain face bearings directly under the face of the pulley portion, and plain face bearings in said hub portion, a diaphragm secured to said shaft outside of said bearings and having an oil collecting duct thereon provided with an inlet port and with an annular channel surrounding said shaft, and a conduit leading from said annular channel to the bearing surfaces of said plain bearings.

6. In a fan pulley assembly, a hollow pulley body adapted to contain oil and having a pulley portion and a hub extension, a shaft stationarily secured at one end only, bearing bushings between said hub extension and shaft, a flanged bearing bushing fixedly secured to said pulley body directly under its pulley face, said shaft having a bearing face for receiving the bearing face of said flanged bearing bushing, a cover plate secured in the open end of said pulley body, and an oil collector mounted on said shaft, there being oil chambers, between said bearings and between said flanged bushing and wall of the pulley body and between said flanged bushing and cover plate, and there being oil ducts connecting said oil chambers, and an oil conduit in the shaft leading from said oil conductor to the bearing faces of said bearings.

7. In a fan pulley assembly, a hollow pulley body adapted to contain oil, a shaft stationarily supported at one end only, plain face bearings between said pulley body and shaft, a diaphragm secured to said shaft outside of said bearings, a chambered plate secured to said diaphragm, the chamber thereof having an oil inlet and an annular oil channel and there being an oil conduit in said shaft leading from said annular oil conduit to the bearing surfaces of said bearings.

GUY F. JONTZ.